United States Patent Office 2,933,707
Patented Apr. 19, 1960

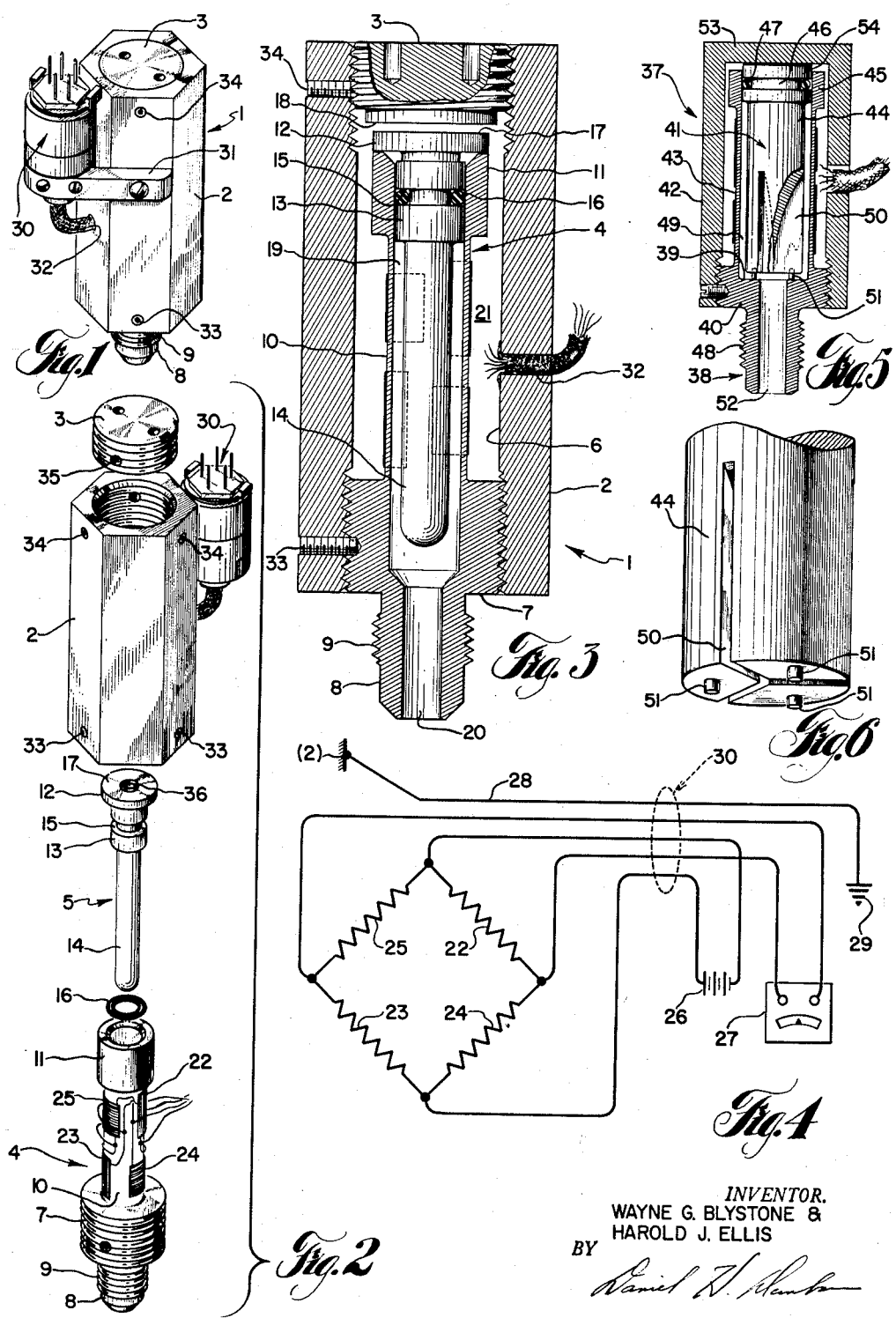

2,933,707

FLUID PRESSURE TRANSDUCER ASSEMBLY

Wayne G. Blystone, Columbus, and Harold J. Ellis, Reynoldsburg, Ohio, assignors to North American Aviation, Inc.

Application February 16, 1959, Serial No. 793,538

7 Claims. (Cl. 338—4)

This invention concerns an electro-mechanical fluid pressure transducer assembly which may be utilized to obtain pressure measurements pertaining to a relatively confined pressurized fluid. More particularly, this invention relates to a fluid pressure transducer assembly having a tubular transducer element for receiving pressurized fluid, having electrical resistance strain gauge means provided on the transducer element to measure expansion and contraction of the transducer element caused by the pressurized fluid, and having a novel means for closing off one end of the transducer element to thereby obtain improved performance characteristics with respect to the transducer element and strain gauge means combination.

It is an important object of this invention to provide a fluid pressure transducer assembly that may be utilized to obtain an improved degree of measurement accuracy over a comparatively wide range of operation conditions.

Another object of this invention is to provide a pressure transducer having a tubular pressure-sensing element with an arrangement which prevents adverse end-loading of that element when pressurized fluids are introduced therein.

A still further object of our invention is to provide a fluid pressure transducer assembly which is not readily subjected to resonant frequency vibration, and which is not adversely affected by reverse-flow or high-velocity pressure head conditions.

Another object of our invention is to provide an improved fluid pressure transducer assembly of the dead-end type which may be coupled directly to a portion of a system containing pressurized fluid.

Another object of this invention is to provide a fluid pressure transducer assembly which incorporates an arrangement that confines fragmentation of an included transducer element in the event of structural failure thereof, and that facilitates inspection and servicing of the assembly without requiring removal or disturbance of its measuring components.

A still further object of our invention is to provide a fluid pressure transducer assembly of the dead-end type which may be economically fabricated using known manufacturing techniques, which may be easily installed and maintained in its operating condition, and which offers a high degree of operational reliability.

Other objects and advantages of this invention will become apparent during consideration of the following detailed description and accompanying drawings.

In the drawings:

Fig. 1 is a perspective view of a dead-end type fluid pressure transducer assembly incorporating the features of this invention;

Fig. 2 is an exploded perspective view of the transducer assembly of Fig. 1;

Fig. 3 is a longitudinal section of the assembly of Fig. 1;

Fig. 4 is a schematic diagram of a circuit arrangement which may be combined with the transducer assembly of Figs. 1 through 3 to obtain improved fluid pressure measurements;

Fig. 5 is a sectional view of another transducer assembly embodying the features of our invention; and Fig. 6 is an enlarged perspective view of a portion of the insert means illustrated in Fig. 5.

Referring to the drawings, fluid pressure transducer assembly 1 is of the dead-end type, and is comprised of shell 2, threaded plug means 3, a pressure-sensing transducer element 4 for converting fluid pressure values to corresponding electrical signals, and an insert means 5 provided to close off one interior end portion of transducer element 4. Shell 2 may be fabricated conveniently from hexagonal stainless steel bar stock or the like, and is provided with longitudinal bore 6 having either extreme provided with a threaded portion. One interior threaded end portion of shell 2 receives plug means 3, and the other interior end portion receives threaded base portion 7 of transducer element 4.

In addition to base portion 7, transducer element 4 is provided with integral projection portion 8 which has threaded means 9 provided thereon for use in connecting assembly 1 to a portion of a fluid system having a pressurized medium. Also provided integral with base portion 7 of transducer element 4 is the relatively thin-walled, pressure-sensing, tube portion designated 10. The end of transducer element 4 opposite projection portion 8 is provided with the cylinder portion designated 11; cylinder portion 11 is sufficiently large to be dimensionally stable throughout the operating pressure range of the transducer assembly 1. The inner and outer diameters of tube portion 10 are preferably constant throughout the range from base portion 7 to cylinder portion 11 prior to the introduction of pressurized fluid therein. However, when pressurized fluids are introduced into the interior of tube portion 10, circumferential expansion of portion 10 ensues. Electrical resistance type strain gauge portions are incorporated into transducer element 4 in a manner which will hereinafter be recited in detail.

To confine pressurized fluid within transducer element 4 following its introduction through projection portion 8, we provide the insert means designated generally as 5. Insert means 5 is basically comprised of flanged end portion 12, piston portion 13, and volume-reducing stem portion 14. Piston portion 13 is adapted to slide in the interior of cylinder portion 11 of transducer element 4, and is provided with a groove 15 that carries O-ring seal 16. Piston portion 13, together with associated seal 16, functions to confine pressurized fluids within the interior of transducer element 4 without introducing adverse end-forces into tube portion 10 of the element.

The transducer assembly of this invention also provides for reciprocal movement of insert means 5. The degree of movement which may occur is limited, and may best be described in connection with Fig. 3 wherein flanged end portion 12 of the insert means is illustrated as being initially in contact with the free end of transducer element cylinder portion 11. This illustration also represents the relationship which exists between components of the assembly 1 when the fluid system being monitored contains pressures which are less than atmospheric or ambient pressures. The introduction of a fluid having a positive pressure (greater than ambient pressure) into transducer element 4 causes insert means 5 to be moved upwardly but only until surface 17 thereof contacts surface 18 of plug means 3.

It should be noted that by the above-described arrangement, all longitudinal or end forces acting within tube portion 10 and upon piston portion 13 and stem portion 14 are transmitted into plug means 3 through the contacting relation established therewith. Forces thereby introduced into plug means 3 are in turn transmitted to structure supporting transducer assembly 1 through shell 2, base portion 7 of the transducer element, projection portion 8 of the transducer element, and the coupling means (not shown) which cooperates with thread means 9. Insert means 5, being continuously movable relative to transducer element 4, does not introduce or transmit end forces into tube portion 10 but does effectively close off the free end of transducer element 4.

The elongated volume-reducing stem portion 14 projects from piston portion 13 to substantially fill the interior of transducer element tube portion 10 and thereby create annular pressure chamber 19. Stem portion 14 minimizes the volumetric disturbances which might otherwise be present when transducer assembly 1 is connected to a fluid line or pressurized fluid system. Also, stem portion 14 should be sufficiently short so that transient fluid flow in and out of pressure chamber 19 and passageway 20 is not restricted thereby. Although the diameter of stem portion 14 approaches the inner diameter of tube portion 10, it is important that a non-contacting relation therebetween be maintained in order to assure proper functioning of the transducer assembly.

Pressurized fluid introduced into annular chamber 19 does act to circumferentially expand at least the center parts of tube portion 10 and simultaneously reduce the overall length thereof. Such dimensional changes are in proportion to the relative pressure magnitude of the fluid introduced into transducer assembly 1 through projection portion 8 and passageway 20. During distortion of tube portion 10, insert means 5 remains relatively fixed and in abutting relation to plug means 3 but permits cylinder 11 to move relative to piston portion 13. In this arrangement no adverse longitudinal forces are introduced into tube portion 10 through the longitudinal contraction thereof.

Attached to the outer surface of tube portion 10 by a suitable adhesive or other conventional means are electrical resistance strain gauge means 22, 23, 24, and 25. It is preferred that means 22 through 25 each be selected to obtain equal electrical resistance therein. Gauge members 22 and 23 are placed upon tube portion 10 to measure tube distortion in a direction parallel the longitudinal axis of element 4; gauge members 24 and 25 are oriented generally perpendicular the longitudinal axis of element 4 to measure circumferential expansion therein. Various arrangements of strain gauge members upon the transducer element 4 may be utilized for particular applications without departing from the scope of our invention. In general, it is preferred that the resistance strain gauges be symmetrically located toward the midsection of tube portion 10 in order that measurement irregularities based upon proximity to circumferentially restricted transducer element portions 7 and 11 might be avoided. In the Fig. 2 arrangement, strain gauges 22 and 23 are located in an off-set and diametrically opposed relation to each other; similarly, gauge members 24 and 25 are mounted on tube portion 10 in a like manner. Other known conventional strain gauge arrangements may be employed in transducer assembly 1 as an alternate.

Resistance-type strain gauges 22 through 25 may be arranged and combined with an electrical circuit in the manner illustrated schematically in Fig. 4. As shown therein, gauge means 22 through 25 constitute active legs of a Wheatstone bridge circuit having a power source 26 and having a galvanometer device 27 which indicates the nature and magnitude of the unbalanced output signal established by the strain gauges during distortion of tube portion 10. A separate lead 28 may be provided to connect the transducer assembly to electrical ground 29. Other circuit arrangements may be employed with the strain gauges incorporated on tube portion 10; similarly, the electrical circuit utilized might be connected to another type of output device such an amplifier or recorder, as required.

Electrical pin disconnect 30 is attached to shell 2 by bracket fixture 31 to enable transducer assembly installation without disturbing the electrical leads connecting strain gauge means 22 through 25 to the electrical circuit arrangement. Such leads are extended from the disconnect 30 to the strain gauges through the vent port 32 provided in shell 2. Vent ports 32 is of sufficient diameter to accommodate a grouping of individual electrical leads or a single cable. In addition, vent port 32 must be sufficiently large to establish pressure communication between annular chamber 21 (Fig. 3) and atmospheric conditions which are external to transducer assembly 1. Should tube portion 10 fail during use of the assembly, because of either a structural failure therein or because of excessive pressures associated with the pressurized fluid being measured, shell 2 functions to restrict the escape of tube portion fragments.

Set screw means 33 are provided to secure shell 2 and base portion 7 relative to each other subsequent to their assembly. This arrangement functions to facilitate installation of the transducer assembly into a fluid line, bulkhead, or the like. Set screw means 34 are provided in the opposite end of shell 2 to engage pockets 35 provided in plug means 3. This latter arrangement assures suitable clearance between surface 18 of plug means 3 and end face 17 of insert means 5 when the unit is properly assembled. In an alternate embodiment, plug means 3 and insert means 5 might be combined as a single or integral element. However, an arrangement of this alternate type would be satisfactory only if it were certain that no external side loads would be applied to shell portion 2, or its equivalent, either directly or indirectly. It is important in any arrangement of the transducer assembly of our invention that extraneous forces not be mechanically transmitted into tube portion 10 during operation of the unit.

In the preferred arrangement, plug means 3 may be removed to provide an access to internal components of the transducer assembly. Removal of insert means 5 from the assembly is facilitated by the provision of threaded blind bore 36 in flanged end portion 12 thereof. Bore 36 is provided to receive the threaded portion of a withdrawal tool such as a conventional screw or bolt. Removal of insert means 5 permits inspection of the outer walls of chamber 19 and of passageway 20.

It should be noted that inspection and maintenance of transducer assembly 1 is accomplished without removing transducer element 4 from the fluid system being monitored. Thus, there is no disturbance of the comparatively fragile strain gauge means 22 through 25 and the electrical leads associated therewith. Following an inspection or cleaning operation, or the like, insert means 5 may be replaced in transducer element 4 so that piston portion 15 is contained within cylinder portion 11. Plug means 3 is then returned to its indexed position where it is located in place through the cooperation of set screws 34 and pocket means 35.

Fig. 5 illustrates another fluid pressure transducer assembly incorporating the features of our invention. This embodiment is particularly adaptable for use in applications wherein installation space is restricted or wherein a limited necessity for periodic maintenance inspection exsists. Transducer assembly 37 includes a transducer element 38 similar to the heretofore-described transducer element 4 except for the provision of annular platform 39 in base portion 40 to act as a support for insert means 41. A housing 42 is threadably attached to base portion 40 to contain the thin-walled tube portion 43 and to limit movement of insert means 41. Housing 42 is essentially the equivalent of components 2 and 3 of the Figs. 1 through 3 arrangement taken in combination.

Insert means 41 is comprised of a piston portion 54 and a volume-reducing stem portion 44. Piston portion 54 is adapted to slide in the enlarged cylindrical end portion 45 of transducer element 38, and is provided with groove means 46 for carrying the pressure seal means 47.

To provide for un-restricted transient pressure flow between connector portion 48 and annular chamber 49, stem portion 44 of insert member 41 is provided with slot-like channels 50 which converge at the end of stem portion 44. Channels 50 extend from the end of insert means 41 to approximately the mid-point of stem portion 44. To further insure un-restricted fluid flow, pins 51 are provided to separate the end plane of stem portion 44 from resting upon annular platform 39. Pins 51 are carried by stem portion 44 and are supported by base portion 40 when the assembly interior is in a non-pressurized condition. Fluid entering transducer assembly 37 through passageway 52 will readily pass to annular chamber 49 through radial slots 50 and through the end space between insert means 41 and annular platform 39. When a positive pressure condition is established in chamber 49, piston portion 54 of insert means 41 is urged into abutting relation with end portion 53 of housing member 42. During the positive pressure condition, pins 51 are moved out of contact with the annular platform 39.

Transducer assembly 37 functions in a nearly identical manner to transducer assembly 1. However, in the arrangement illustrated, the length of tube portion 43 is decreased to provide an overall shortening of the transducer element. This, as is readily appreciated, permits installation of the assembly under limited space conditions.

One important advantage to the pressure transducer assembly having the features of this invention is the complete absence of adverse end-loadings on the tubular element which carries the variable resistance-type strain gauges. This advantage is manifested by obtaining highly accurate readings which are characterized by their better correlation with Poisson's ratio. This advantage, coupled with inherent temperature compensation provisions in the assembly, permits use of a less complex system of computation to thereby allow early utilization of the measurements obtained. Also, it has been determined that a transducer assembly incorporating the features of our invention will provide a degree of linearity which is within ¼ of 1% of full scale value.

It is to be understood that the forms of the invention herewith shown and described are to be taken as preferred embodiments of the same, but that various changes in the shape, size, and arrangement of parts may be resorted to without departing from the spirit of the invention or the scope of the subjoined claims.

We claim:

1. A pressure transducer assembly of the electro-mechanical type, comprising: a transducer element having a tube portion and having a base portion and a cylinder portion of comparatively enlarged dimension connected by said tube portion, electrical strain gauge means secured to said transducer element tube portion, insert means slidably contained in said transducer element and having an end portion projecting from in said transducer element cylinder portion, and separate stop means aligned with said insert means end portion, said stop means being mechanically coupled to said transducer element base portion whereby end forces established by pressurized fluid introduced into said transducer element and acting upon said insert means are transmitted to said transducer element base portion in by-pass relation to said transducer element tube portion.

2. The combination defined in claim 1, wherein said assembly includes a connecting means mechanically coupling said transducer element to a source of pressurized fluid in fluid-conducting relation, said connecting means being joined to said transducer element enlarged base portion at an extreme opposite said tube portion.

3. The combination defined in claim 1, wherein said insert means includes a piston portion and a volume-reducing stem portion connected to said piston portion, said piston portion being located interiorly of said transducer element cylinder portion and said stem portion being located interiorly of said transducer element tube portion when pressurized fluid moves said insert means into contact with said stop means.

4. The assembly defined in claim 1, wherein said insert means end portion includes a flange means located exteriorly of said transducer element cylinder portion, said flange means contacting said transducer element cylinder portion to limit movement of said insert means in one direction only.

5. A dead-end-type electro-mechanical pressure transducer assembly comprising: a transducer element having a tube portion and having a force-absorbing base portion and a cylinder portion of larger dimension connected by said tube portion, electrical strain gauge means secured to said transducer element tube portion, insert means slidably contained in said transducer element and having an end portion projecting outside said transducer element cylinder portion, stop means aligned with said insert means end portion, and a shell member connected to said transducer element base portion and connected to said stop means whereby extraneous forces established by pressurized fluid contained in said transducer element act upon said insert means and are transmitted by said insert means to stop means, by said stop means to said shell member, and by said shell member to said transducer element force-absorbing base portion thereby isolating said transducer element tube portion from the extraneous forces.

6. A dead-end-type pressure transducer assembly which includes a distortable tubular transducer element receiving pressurized fluid therein, electrical strain gauge means secured to said transducer element to measure the distortion of said transducer element caused by the pressurized fluid received therein, and insert means slidably contained in said transducer element to close off one end of said transducer element and prevent the escape of pressurized fluid therethrough, said insert means being movably restricted exteriorly of said transducer element whereby end forces established by pressurized fluid received in said transducer element are introduced into said insert means and separated from said transducer element.

7. An electro-mechanical pressure transducer assembly of the dead-end-type and comprising: a flexible tube element which receives pressurized fluid therein, electrical strain gauge means attached to said tube element to measure distortion caused by the pressurized fluid received therein, movable insert means contained in said tube element and closing off one interior end of said tube element to prevent the escape of pressurized fluid therefrom, and separate means isolated from said tube element in force-transmitting relation to restrict movement of said insert means, said insert means and said separate means being separated from said tube element in force-transmitting relation to prevent end forces established by pressurized fluid introduced in the tube element from being transmitted to said strain gauge means.

References Cited in the file of this patent

UNITED STATES PATENTS

| | | |
|---|---|---|
| 2,472,045 | Gibbons | May 31, 1949 |
| 2,509,421 | Carter | May 30, 1950 |
| 2,510,785 | Potts | June 6, 1950 |
| 2,637,210 | Hathaway | May 5, 1953 |